United States Patent
Rauba (10) Patent No.: US 8,468,451 B1
(45) Date of Patent: Jun. 18, 2013

(54) ONLINE CUSTOMER SERVICE VIA WEBSITE NAVIGATION INTERVENTION

(75) Inventor: Rimas Rauba, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 728 days.

(21) Appl. No.: 11/769,617

(22) Filed: Jun. 27, 2007

(51) Int. Cl.
*G06F 3/00* (2006.01)

(52) U.S. Cl.
USPC ........... 715/705; 715/709; 715/740; 715/741; 715/751

(58) Field of Classification Search
USPC ................. 715/705–709, 736–742, 750–759, 715/808–809, 962
See application file for complete search history.

(56) References Cited

U.S. PATENT DOCUMENTS

| | | | |
|---|---|---|---|
| 6,295,051 B1 * | 9/2001 | Kanevsky et al. | 345/163 |
| 7,020,622 B1 * | 3/2006 | Messer | 705/26.44 |
| 7,194,685 B2 * | 3/2007 | Morrison | 715/705 |
| 7,657,465 B2 * | 2/2010 | Freishtat et al. | 705/27 |
| 7,739,329 B2 * | 6/2010 | Thompson | 709/203 |
| 2002/0047859 A1 * | 4/2002 | Szlam et al. | 345/705 |
| 2002/0130895 A1 * | 9/2002 | Brandt et al. | 345/708 |
| 2003/0154120 A1 * | 8/2003 | Freishtat et al. | 705/9 |
| 2003/0167222 A1 * | 9/2003 | Mehrotra et al. | 705/37 |
| 2004/0056878 A1 * | 3/2004 | Lau et al. | 345/706 |
| 2004/0153368 A1 * | 8/2004 | Freishtat et al. | 705/26 |
| 2005/0033843 A1 * | 2/2005 | Shahi et al. | 709/226 |
| 2005/0192872 A1 * | 9/2005 | Spetner | 705/26 |
| 2005/0268234 A1 * | 12/2005 | Rossi et al. | 715/705 |
| 2006/0265656 A1 * | 11/2006 | Lambert et al. | 715/705 |

OTHER PUBLICATIONS

Esenther, Alan W., Instant Co-Browsing: Lightweight Real-Time Collaborative Web Browsing, 2002, Mitsubishi Electric Research Laboratories, In Proc. of the 11th Int vol. 1.*
Lands' End Live, retrieved on Sep. 29, 2006 at <<http://live.landsend.com/callFormACD.jhtml>>, Landsend, 1 page.

\* cited by examiner

*Primary Examiner* — Weilun Lo
*Assistant Examiner* — Enrique Iturralde
(74) *Attorney, Agent, or Firm* — Greenblum & Bernstein, P.L.C.

(57) ABSTRACT

Tools and techniques for online customer service via website navigation intervention are described herein. Methods provided by these tools may include monitoring activities of a user who is interacting with a website while utilizing a user device. These activities may indicate that the user would benefit from assistance while interacting with the website, and the tools may accordingly formulate data representing an offer of assistance to the user. In some instances, the user device may send a request for assistance to a customer service system, and may surrender control of the user device to the customer service system. The user device may receive assistance from the customer service system, and afterwards, regain control of the device when the assistance is completed.

17 Claims, 5 Drawing Sheets

ONLINE CUSTOMER SERVICE VIA WEBSITE NAVIGATION INTERVENTION

BACKGROUND

Users browsing online websites have conventionally been limited to e-mail correspondence for customer service assistance. User inquiries regarding product purchases, services, or hotel room and rental car reservations often result in waiting periods from hours to days for responses from website customer service departments. Often, e-mail responses from customer service departments do not address the information requested by the user, and the user must either inquire again and clarify the original question, or give up on the inquiry, and possible purchase, altogether.

More recently, text instant messaging between users and customer service representatives for select websites has aided users in acquiring information while browsing online. However, communication problems may arise with customer service systems that support only text messaging. Examples of such problems may include misinterpreted inquiries, miscommunication between the customer service representative and the user, delayed typing periods resulting in communication disconnections, or the like. Oftentimes, these types of interactions do not resolve problems that users experience with the websites, and users are left to make purchasing or other decisions with no substantive customer service assistance.

SUMMARY

This summary is provided to introduce features and concepts of online customer service via website navigation intervention, and is not intended for use in determining the scope of the claimed subject matter.

Tools and techniques for online customer service via website navigation intervention are described herein. Methods provided by these tools may include monitoring activities of a user who is interacting with a website while utilizing a user device. These activities may indicate that the user would benefit from assistance while interacting with the website, and the tools may accordingly formulate data representing an offer of assistance to the user. In some instances, the user device may send a request for assistance to a customer service system, and may surrender control of the user device to the customer service system. The user device may receive assistance from the customer service system, and afterwards, regain control of the device when the assistance is completed.

BRIEF DESCRIPTION OF THE DRAWINGS

The same numbers are used throughout the drawings to reference like features and components.

DETAILED DESCRIPTION

Tools and techniques for providing online customer service via website navigation intervention are described in which implementations provide for direct customer service assistance via verbal communication and navigation intervention to users navigating through websites. Users interacting with a website may request verbal assistance from customer service departments associated with the website. This assistance may relate to website operations, to details of particular products and/or services offered through the website, or the like. The tools described herein may enable the users to initiate customer service inquiries on the website. When the tools receive a given inquiry, the tools may enable a customer service representative to respond to the inquiry by speaking directly to the user via, for example, a broadband internet connection between the representative and the user, a telephone link, or other suitable verbal communication techniques. In addition, the tools may enable a customer service representative to assume control of the user's device or computing system, at least in part to resolve the request.

The online customer service tools via website navigation intervention as described herein may enable customer service representatives to view the website location or page with which a user is experiencing difficulty. After the tools receive an assistance inquiry from the user, online customer service may determine the website location where the problem originated. By viewing the source of the inquiry, and by speaking directly to the user in real time or near real time, online customer service may increase the likelihood of resolving the user problem or question, while simultaneously improving website sales and customer satisfaction to the benefit of the website operator.

Online customer service via website navigation intervention may also enable the customer service representative to takeover website navigation on the user's system or device, from the customer service system. At any convenient point after receiving the request for assistance from the user, the customer service representative may assume control of the user's system and may thus assist the user directly, by "driving" the user's machine. This direct assistance may include demonstrating how to reserve a car or hotel room online, may include indicating where information about a particular item of interest to the user is located on the website. As soon as the user's request has been resolved, the customer service representative may return control of the user's device back to the user.

Online customer service via website navigation intervention may also enable a customer service system to offer expanded options to users navigating the website. The customer service system may monitor a user's browsing activity to detect indications that the user may be looking for options other than those displayed on the website. If such indications appear, the customer service system may offer one or more expanded options to the user to facilitate the sale of a product or service on the website that is of interest to the user. Examples of these expanded options may include a free upgrade to a better product or service, an improved price for a product or service than the price listed on the website, or an improved product or service than that offered on the website.

While features and concepts of the described systems and methods for online customer service via website navigation intervention can be implemented in any number of different environments, systems, and computing-based systems, implementations of online customer service via website navigation intervention are described in the context of the following exemplary systems and environments.

Figure 1:
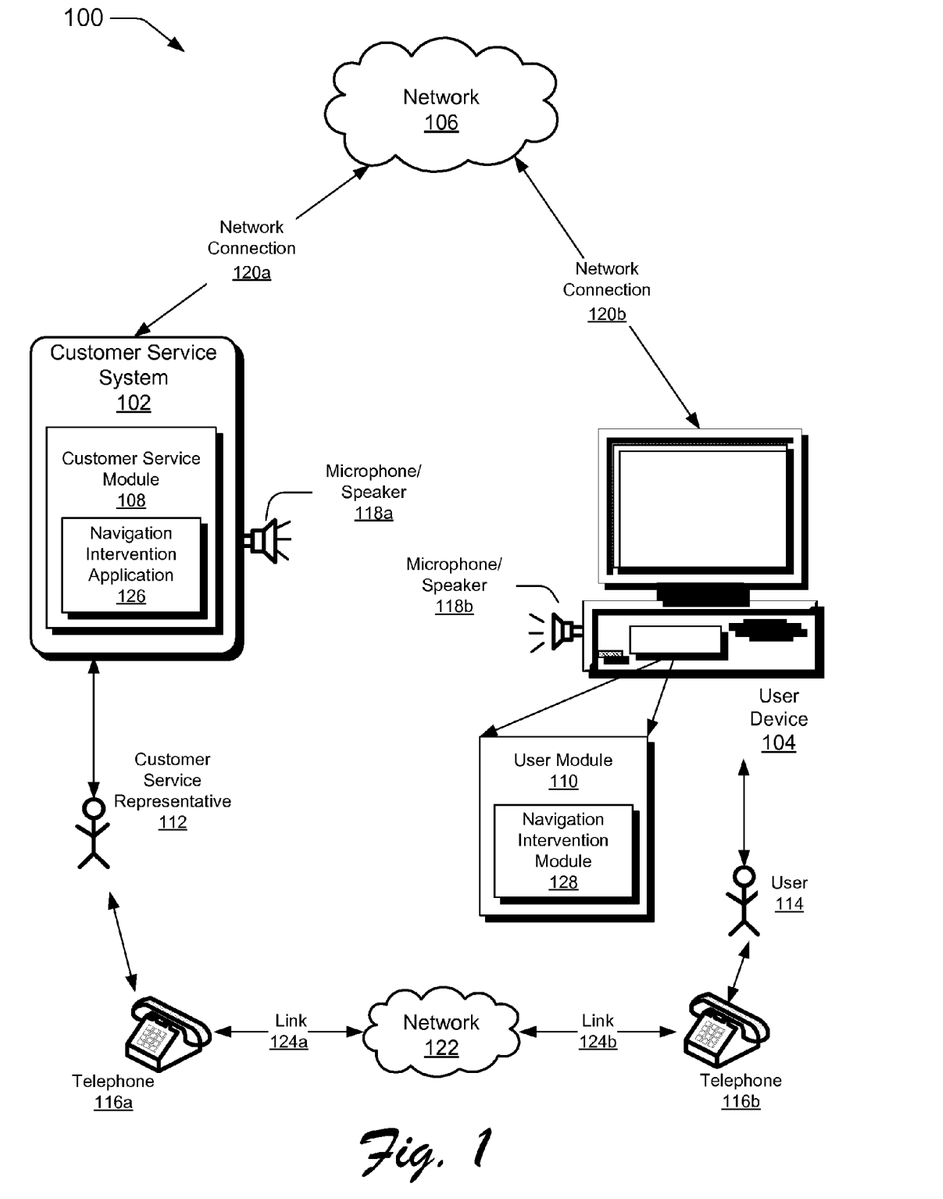
FIG. 1 is a block diagram illustrating an exemplary system in which implementation(s) of online customer service via web site navigation intervention can be accomplished.

FIG. 1 illustrates an exemplary operating environment or system 100 in which implementations of online customer service via website navigation intervention can be accomplished. The illustrated configuration of the system 100 is only one example arrangement. Many arrangements of the illustrated components, or other similar components, are possible within the scope of the subject matter described herein. The system 100 may include a customer service system 102, a user device 104 associated with a user, and a data network 106 placing the system 102 and the user device 104 in communication. The customer service system may include a customer service module 108, while the user device may include a user module 110 that cooperates with the customer service module 108.

The user device 104 as shown in FIG. 1 may represent a variety of different devices. Non-limiting examples of such devices may include: desktop, laptop, or notebook computing systems; personal digital assistants (PDAs), PDAs with wireless communication capabilities (e.g., smart phones); mobile or cellular telephones; VoIP phones; or the like. Accordingly, it is noted that the illustration shown in FIG. 1 is provided only for ease of description, but not to limit possible implementations of the description herein.

As detailed further below, the customer service module 108 and the user module 110 may include one or more modules of computer-readable and executable instructions that cause the customer service system and the user device, respectively, to perform the various functions described herein. A customer service representative 112 may interact with the customer service system 102, while a user 114 may interact with the system via the user device 104.

The system 100 may include respective telephones 116a and 116b (collectively, telephones 116) by which the user 114 and the customer service representative 112 may communicate, with the telephone 116 providing an additional communication channel beyond the network 106. The customer service system 102 may include a microphone/speaker set 118a, while the user device 104 may include a microphone/speaker set 118b (collectively, microphone/speaker sets 118). The microphone/speaker sets 118 may receive and provide communications transmitted over the data network 106 or over a suitable voice network.

Generally, the user device 104 and the customer service system 102 may communicate via network connections 120a and 120b (collectively, network connections 120) that pass through the network 106. The user 114 and the customer service representative 112 may communicate by voice over the network connections 120. Additionally, the user 114 and the customer service representative 112 may communicate via the telephones 116, which in turn may be coupled to a network 122 via respective network links 124a and 124b (collectively, network links 124), and a navigation intervention module 128 and a navigation intervention application 126. The network 122 as shown in FIG. 1 may represent any suitable packet-switched or circuit-switched network, as may be appropriate in different implementations. Examples may include, but are not limited to a public switched telephone network (PSTN), data networks, Voice over IP (VoIP) networks, or the like. The user 114 may interact with the system 102 via the user device 104.

The system 100 may enable the user 114 to request online assistance while interacting with a website. The user 114 may request assistance from the customer service system 102 through, for example, the user device 104, communicating over the network 106 via a variety of suitable communication protocols. The network 106 and related connections 120 may represent links to the public Internet or to a private intranet. The network connections may be wireless or wired connections that transfer communications between the user device 104 and the customer service system 102. Other types of communications networks 106 may also be used to send and receive communications transmitted between the user device 104 and the customer service system 102, in addition to or in place of the Internet. These other types of networks may include local area networks (LANs), wide area networks (WANs), etc.

In some instances, the user may be browsing the website on a web-enabled mobile phone, and may encounter an issue or question with the website. In these examples, the user may communicate by voice with the customer service representative using the same mobile phone.

The user 114 may request assistance in various ways. For example, the user module 110 may provide a user input interface that presents a suitable hyperlink or icon on the website. This hyperlink or icon may be responsive to user input to activate the customer service module 108 on the system 102. Additionally, the user module 110 may enable the user 114 to enter information pertaining to an assistance request into a provided location on the website. The user module 110 may also present a customer service form to the user 114, and prompt the user 114 to complete any relevant fields of this form, or the like. The system 100 may also enable the user 114 associated with the user device 104 to request online website assistance via the network 122. The website may provide a telephone number for the customer service system 102, and the system 100 may enable the user 114 to call this telephone number directly for immediate online website assistance. Additionally, the interaction between the customer service system 102 and the user 114 may also occur in reverse, with the customer service system 102 contacting the user 114 via the network 106 and/or the network 122. The system 100 may also enable the customer service representative 112 to provide this assistance.

The customer service system 102 may receive the website assistance request from the user device 104, and the customer service module 108 may enable the customer service representative 112 to address the request. The customer service module 108 may ascertain the particular problem that led to the assistance request by enabling the customer service representative 112 to identify the website screen viewed by the user 114 of the user device 104, and possibly to view the web site screen. Once this web site screen is identified, the customer service module 108 may determine a solution to the problem, and the system may enable the customer service representative 112 to resolve the request for assistance. The customer service representative 112 may communicate a resolution verbally to the user 114 via the microphone set 118a, with the user 114 hearing the resolution via the speaker set 118b. These communications may travel between the customer service system 102 and the user device 104 via the network connections 120, which may represent a suitable broadband internet connection.

The system 100 may also deliver an audio communication addressing the assistance request to the user 114 via the telephones 116 and the network 122. In this example, the user 114 may initiate an assistance request via a website hyperlink, text input, or by the telephones 116. To request assistance via the telephone 116b, the user 114 may first contact the customer service system 102 by hyperlink or text input, and request a direct telephone number for customer service. After receiving the telephone number from a customer service representative 112, the user 114 may directly call the representative 112 via network 122. Alternatively, the user 114 may enter a telephone number in the initial hyperlink or text input request for assistance, with this telephone number indicating how the customer service representative may reach the user 114 via network 122.

As described previously, the customer service module 108 may help to ascertain the particular problem that led to the assistance request by enabling the customer service representative 112 to identify the website screen viewed by the user 114 of the user device 104. For example, the customer service module 108 may monitor "hits" on the website page and can identify active users on the website based on their originating device address (e.g., an originating IP address, other network address, or other identifier). The customer service module 108 may also track what web pages have been sent to a particular originating device, and can monitor for certain navigation patterns that users may typically exhibit when they encounter trouble with the website. If a particular user exhibits any of these navigation patterns, the customer service module 108 may alert a customer service representative to contact the user having the trouble.

After gathering information regarding the request and/or resolving or at least addressing the problem, the customer service representative 112 may communicate any assistance or resolutions to the user 114 via the telephones 116 and the network 122, utilizing the telephone number provided by the user 114 in the assistance request.

The customer service system 102 may include a navigation intervention application 126 that may assist the user 114 by capturing control of the user's device 104 and directly assisting the user 114 in, for example, navigating a website. Assistance of this type may be initiated when a computer system or the customer service representative 112 of the customer service system 102 monitors user interface activity of the user 114 interacting with the website, and detects from activity on the website that the user 114 may benefit from assistance. This activity may trigger the appearance of a special "assistance icon" or pop-up on the web page that the user is currently navigating. Alternatively, the user 114 may affirmatively request assistance via activation of an icon or hyperlink on the website or by entering text in a form or space provided on the website. Either way, once it becomes clear that a user may benefit from assistance, the customer service representative 112 may take over navigation of the user interface of the user device 104 in order to aid the user 114.

In some implementations, the user module 110 of the user device 104 may include the user-side navigation intervention module 128, which cooperates with the service-side navigation intervention application 126 to enable the customer service representative 112 to take control of the user device 104. These modules 126 and 128 may function similarly to remote access applications that allow users to control and "drive" their computer systems remotely over a network. Remote meeting applications may also allow one of several meeting participants to take control of a document being displayed on the participants' screens, with the one participant editing or navigating the document with the other participants watching. At any convenient point, the one participant may transfer control of the document to any of the other participants. In a similar manner, the customer service representative may take control of the user device 104, navigate on the device to illustrate a resolution, and then return control of the device to the user.

The service-side navigation intervention application 126 and the user-side navigation intervention module 128 may both represent one or more respective modules of software instructions that cause the customer service system 102 to take over navigation operations on the user device 104. More specifically, the navigation module 128 may surrender control of the device 104, to enable the navigation intervention application 126 to take over navigation on the device 104. The navigation intervention application 126 enables the customer service representative 112 to address the user inquiry directly on the device 104 by, for example, demonstrating a solution to a problem, answering user questions, or the like, by manipulating the user interface of the device 104. When the user's request has been resolved, the navigation intervention application 126 and the navigation intervention module 128 may cooperate with one another to return control of the device 104 back to the user to complete the transaction.

Figure 2:
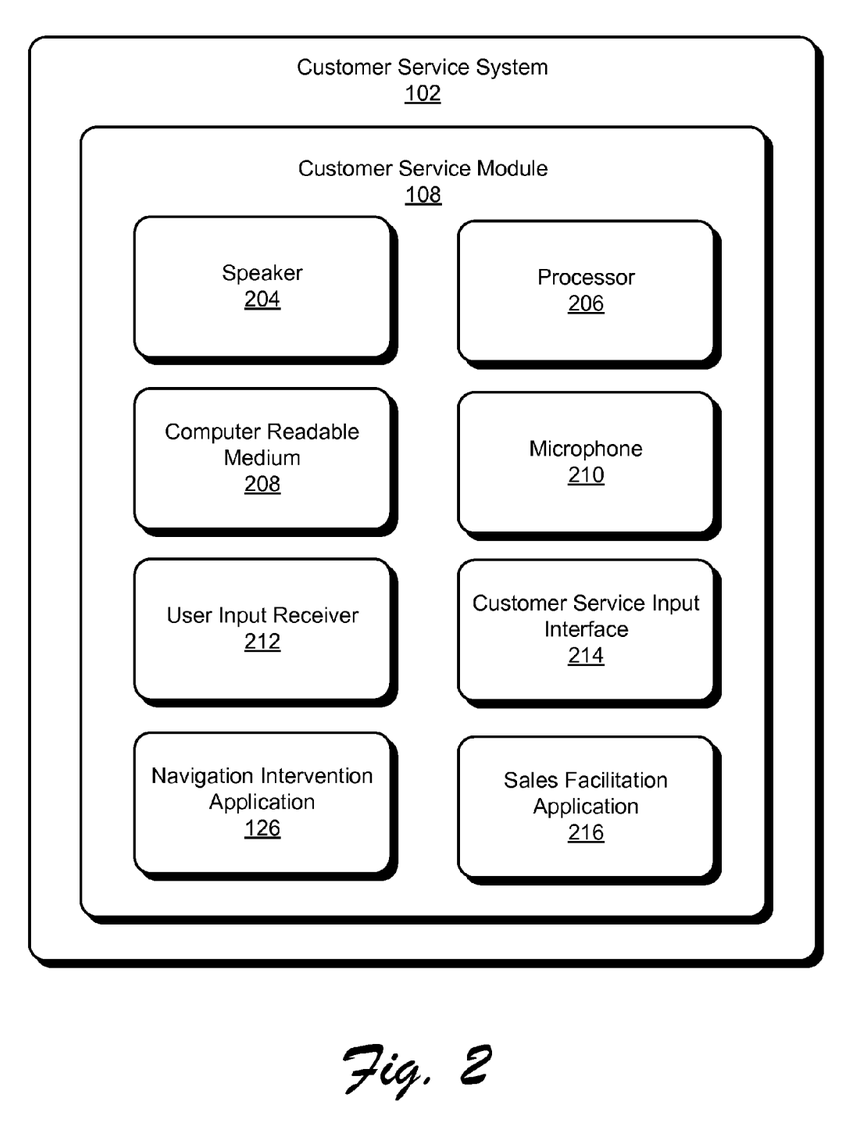
FIG. 2 is a block diagram illustrating a customer service system in which implementation(s) of online customer service via web site navigation intervention can be accomplished.

FIG. 2 illustrates an exemplary embodiment of the customer service system 102 in which embodiments of online customer service via website navigation intervention can be implemented. For convenience of description, but not limitation, some items described previously are carried forward to FIG. 2, and denoted by the same reference numbers.

The illustrated configuration of the customer service system 102 is only one example arrangement. Other arrangements of the illustrated components are possible within the scope of the subject matter described herein. The exemplary customer service system 102 may include the customer service module 108, which in turn may include a speaker 204, a processor 206 for loading and executing instructions from a computer readable storage medium 208, a microphone 210, a user input receiver 212, and a customer service input interface 214. The speaker 204 and the microphone 210 may be provided as part of the microphone speaker set 118a shown in FIG. 1.

The customer service module 108 may also include the navigation intervention application 126 and a sales facilitation application 216. The customer service module 108, user input receiver 212, customer service input interface 214, navigation intervention application 126, and sales facilitation application 216 may be implemented as computer-executable instructions contained on the computer-readable medium 208, which may be read and executed by the processor(s) 206 for the implementation of embodiments of online customer service via website navigation intervention.

In the exemplary customer service system 102, the customer service module 108 may enable the customer service system 102 to receive a request for assistance from a user browsing a website on a user device or computing device. A computing device may include, for example, a personal digital assistant (PDA) or a wireless telephone with an internet connection and the capacity to browse websites on the internet. The customer service system 102 may be associated with the website viewed by the user 114, and the customer service module 108 of the system 102 may be configured to receive assistance requests from users 114 browsing the website and to process and determine solutions to the user requests.

The customer service module 108 may enable a customer service representative, such as the customer representative 112, to receive and process an incoming assistance request from a user, such as the user 114, to examine the subject of the assistance request, and to address and/or resolve the request. In some cases, the customer service representative 112 may view the website page the user 114 is viewing. The customer service module 108 may determine a solution to the assistance request by the user 114, and may enable the customer service representative 112 to communicate the solution to the user 114, and to convey information regarding the assistance request.

The customer service system 102 may include the speaker 204 and the microphone 210, which may utilize the network connections 120a and 120b for audio communication between the customer service representative 112 and the user 114 in near real time. The network connections 120a and 120b may represent, for example, one or more broadband internet connections. This broadband internet connection may provide a means of information exchange between the customer service representative 112 and the user 114. The user device 102 may also include a microphone and speaker system, such as the microphone speaker set 118b, for audio communications with the customer service representative 112 via broadband internet connection.

The user 114 may request assistance from the customer service system 102 by, for example, activating a hyperlink provided on a website, or by entering information into a form or specified location provided by the website. A request for assistance may include information about products or services offered on the website, such as, for example, the availability of shoes in an unusual size, the length of backorder time for a desired sweater or shirt, a particular automobile the user would like to reserve for a rental, the type of hotel room a hotel has to offer for a stated price, luxury amenities at a hotel location, proximity of a hotel to desirable events, and so on. In response to the request for assistance, a customer service representative 112 may respond to the request by text correspondence or by audio communication to the user device 102 via the network 122.

In some cases, the customer service module 108 may enable the customer service representative 112 to respond to the user 114 initially via audio communication. In other cases, the customer service representative 112 may first inquire (e.g., by text correspondence) whether the user 114 would like to communicate by audio via microphone, or by text entry via e-mail, IM, chat, or the like.

The user 114 may also request assistance with the customer service system 102 by utilizing a telephone, such as the telephone 116b, and the network. To initiate the request, the user 114 may first activate a hyperlink provided on the website to request a direct telephone number for customer service of the website. In response to the request, the system 102 may enable the customer service representative 112 to enter a direct telephone number via the customer service input interface 214. The customer service input interface may deliver the number to the user 114 via the internet, allowing the user 114 to directly call the customer service representative 112 via network. Alternatively, the user 114 may enter a telephone number into a form or space provided on the website, with the telephone number indicating where the customer service representative 112 may reach the user 114. The user input receiver 212 may receive the telephone number entered by the user 114, and the system 102 may enable the customer service representative 112 to call the user 114 directly via the network 122 or the data network 106 to the user's device, and to address the assistance request.

The customer service system 102 may enable the customer service representative 112 to assist the user 114 directly by taking over the navigation of the user device 104. More specifically, the navigation intervention application 126 may facilitate this takeover of the user device 104. The customer service representative 112 may take over navigation on the user device 104 after receiving a request for assistance from the user 114, or after monitoring the browsing activity of the user 114 on the website and detecting indications that the user 114 may benefit from assistance. Indications that the user 114 may benefit from assistance may include, for example, predetermined lengths of time in which no user activity on the website is detected, as the navigation intervention application 126 may indicate. Other examples may include indications of user searches for online website help, indications of user clicks on the website in rapid succession, repeated switching between website pages, as if searching for something, and the like.

The navigation intervention application 126 may enable the customer service representative 112 to provide direct assistance to the user 114 by actively demonstrating a solution to the user inquiry, or by navigating to a web site location that provides additional information regarding products or services of interest to the user. The navigation intervention application 126 may also enable the customer service representative 112 to demonstrate how to complete online reservations (e.g., for a flight, hotel room, automobile, or other arrangements), or to illustrate other aspects of manipulating the website to achieve desired results. Direct assistance by the customer service representative 112 in this manner may result in effective customer service assistance via the websites, may facilitate sales of products or services on the website, and may enhance user satisfaction with the overall experience and with the particular website.

The customer service representative 112 may also assist the user 114 in navigating the website by offering the user expanded options via the sales facilitation application 216 of the customer service module 108. The sales facilitation application 216 may enable the customer service representative 112 to monitor the activity of the user 114 browsing the website and to detect that the user 114 may benefit from expanded options beyond those provided on the website at a given time. The sales facilitation application 216 may enable the customer service representative 112 to offer "up-sells" to the user 114 to retain the interest of the user 114 in the website, and to ultimately facilitate sales of merchandise or services offered through the website. Examples of user activity that may prompt one or more upsell offers by the sales facilitation application 216 may include rapid switching between a first and second option offered on the website, detailed inquiries regarding a specific product, multiple return visits to the website viewing the same product or service description, multiple clicks on the website in rapid succession, or the like.

The sales facilitation application 216 may also enable the customer service representative 112 to offer the user 114 exclusive deals not otherwise found on the website. These exclusive arrangements may include better prices for product and/or services already offered on the website, new and improved products and/or services for the same price as an older version of the product/service, an upgraded hotel room or automobile for the same price of a lesser room or model, a product or service offered at a lower price than a competitor's known price, and so on. The offer may be provided to the user 114 via pop-up messaging on the user device 104, or the offer may be delivered by text or voice messaging delivered via a suitable internet connection (e.g., broadband).

Figure 3:
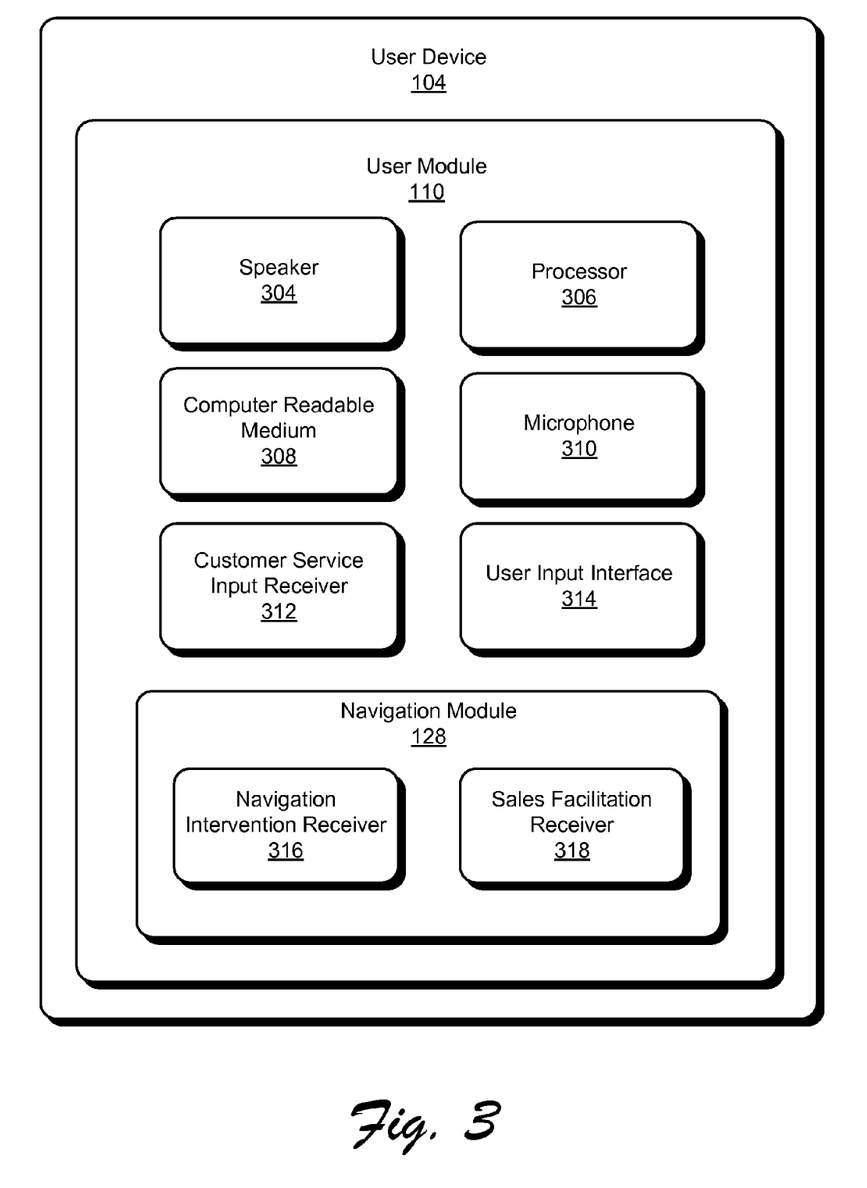
FIG. 3 is a block diagram illustrating a user device of a user in which implementation(s) of online customer service via website navigation intervention can be accomplished.

FIG. 3 illustrates exemplary embodiments of the user device 104 in which embodiments of online customer service via website navigation intervention may be implemented. For convenience of description, but not limitation, some items described previously are carried forward to FIG. 3, and denoted by the same reference numbers.

The illustrated configuration of the user device 104 is one example arrangement. Other arrangements of the illustrated components in the exemplary user device 104 are possible within the scope of the subject matter. The exemplary user device 104 may operate with the user module 110, a speaker 304, a processor 306, a computer readable medium 308, a microphone 310, a customer service input receiver 312, a user input interface 314, a navigation intervention receiver 316, a sales facilitation receiver 318, and the navigation intervention module 128. The speaker 304 and the microphone 310 may be provided as part of the microphone speaker set 118*b* shown in FIG. 1. The customer service input receiver 312, user input interface 314, navigation intervention receiver 316, and sales facilitation receiver 318 may be implemented as computer-executable instructions contained on the computer-readable medium 308, which may be read and executed by the processor(s) 306 for the implementation of embodiments of online customer service via website navigation intervention.

The user module 110 of the exemplary user device 104 may enable a user, such as the user 114, to request assistance from a website while browsing websites on the internet. For example, the user 114 may be perusing a website that offers all-inclusive vacation packages, and may have several questions requiring answers prior to reserving the vacation. The user module 110 of the user device 104 may enable the user 114 to initiate an assistance request and contact the customer service system 102 of the website by, for example, activating a hyperlink on the website for contacting customer service or by entering information via the user input interface 314 into an assistance request form provided on the website. The request may be delivered to the customer service system 102 of the website via the internet connection, and correspondence between a customer service representative, such as the customer service representative 112, of the customer service system and the user 114 may continue from this point via text entry or audio communication.

Correspondence between the customer service representative 112 and the user 114 by audio communication may proceed via the network connections 120*a* and/or 120*b*, which may include a broadband internet connection. The user device 104 may include the microphone 310 and speaker 304 to enable audio communication between the user device 104 and customer service system 102 via broadband internet connection. Similarly, the customer service system 102 may include a microphone and speaker, such as the microphone 210 and the speaker 204, to enable audio communication via the internet connection. Following the initial request for assistance by the user 114 via the user module 110, the customer service module 108 of the customer service system 102 may enable the representative 112 to respond to the assistance request by audio communication. Correspondence between the user 114 and the representative 112 may continue by audio communication until questions are answered or a solution to the initial user problem is reached.

Audio communication between the customer service representative 112 and the user 114 may also proceed via telephone and the network. The tools described herein may enable the user 114 to request a direct telephone number for a customer service representative 112. The tools may also enable the customer service representative 112 to provide a direct telephone number and deliver it to the user 114 via, for example, an internet connection. The tools may also enable the user 114 to receive the direct telephone number for the customer service representative 112 via the customer service input receiver 312, and may enable the user 114 to directly call the representative 112 for assistance via telephone and/or network. Conversely, the user 114 may provide, with the initial request for website assistance, a direct telephone number via the user input interface 314 of the user module 110 where he/she may be contacted. In this example, the customer service representative 112 may receive the user's telephone number and communicate directly with the user 114 via telephone and network. Audio communication via telephone and network may continue until questions are answered or a solution to the initial user problem is reached.

The user 114 may also receive assistance from the customer service representative 112, in that the navigation module 128 may enable the customer service representative 112 to take over navigation of the website on the device 104. The navigation module 128 may include the navigation intervention receiver 316 that enables the navigation intervention module 128 to receive assistance or intervention from the customer service representative 112. More specifically, the navigation intervention receiver 316 may enable the customer service representative 112 to manipulate the user device 104 remotely from the customer service system (e.g., 102), with the results of this manipulation appearing on a user interface of the user device 104. In this manner, the user 114 may receive direct assistance in response to inquiries regarding products, services, or general usage of the website. This direct assistance may provide faster solutions to user inquiries and may increase user patronage of the website.

The user 114 may also receive assistance from the customer service representative 112 in the form of offers for expanded options that are not featured immediately on the website at a given time. The sales facilitation receiver 318 may receive these expanded offers at any time the user 114 is browsing the website. The offers may appear on the user interface as pop-up messages inquiring whether the user 114 would be interested in a special deal, an upgrade, or an improved product or service. The offers may also be delivered by text or voice messages via broadband internet connection.

In some instances, the customer service representative 112 may take over the user device 104, to demonstrate an offer being made and to facilitate the sale to the user 114. This take over may occur if the user 114 shows interest in receiving additional offers. The navigation intervention receiver 316 of the navigation intervention module 128 may enable the customer service representative 112 to take over navigation of the user device 104.

Figure 4:
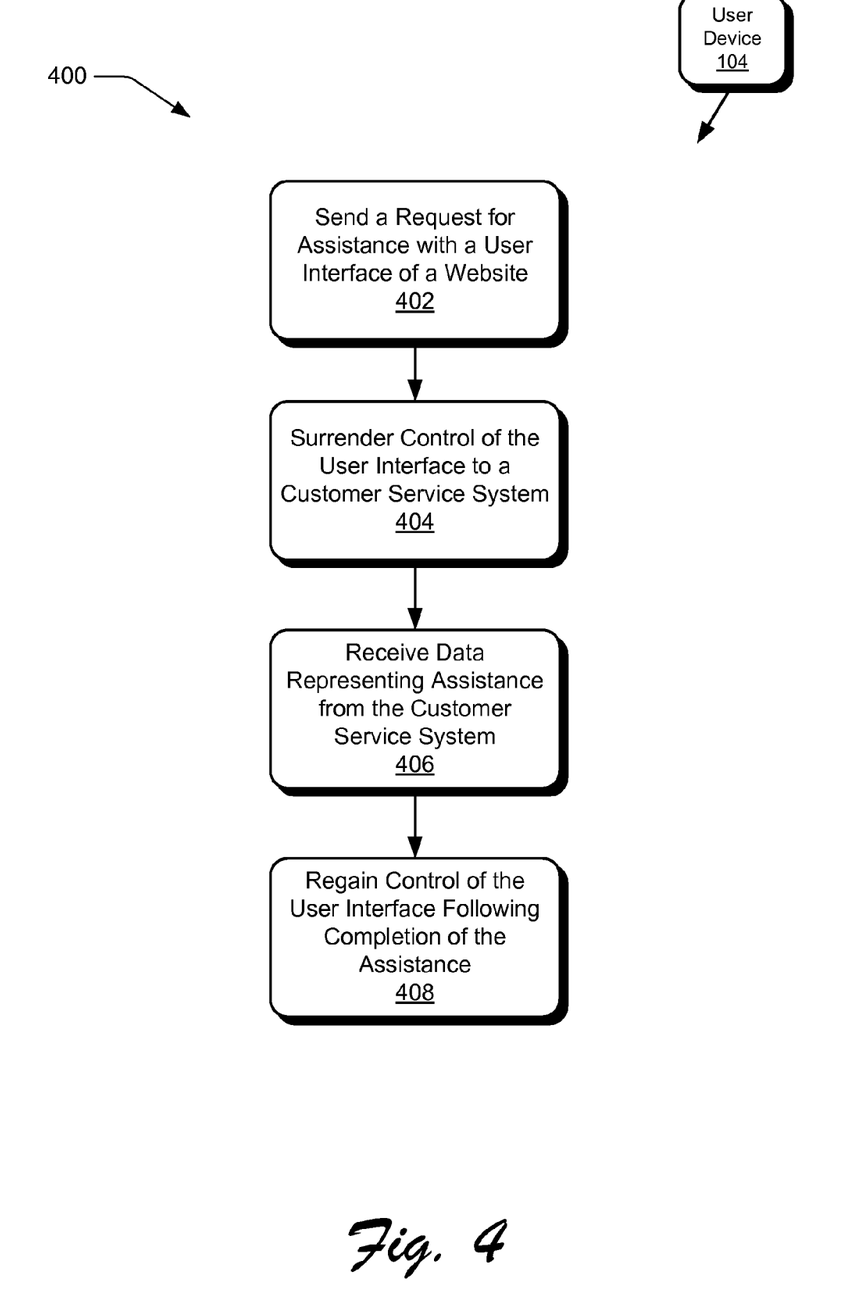
FIG. 4 is a flow diagram illustrating an exemplary method in which implementation(s) of online customer service via website navigation intervention can be accomplished.
Figure 5:
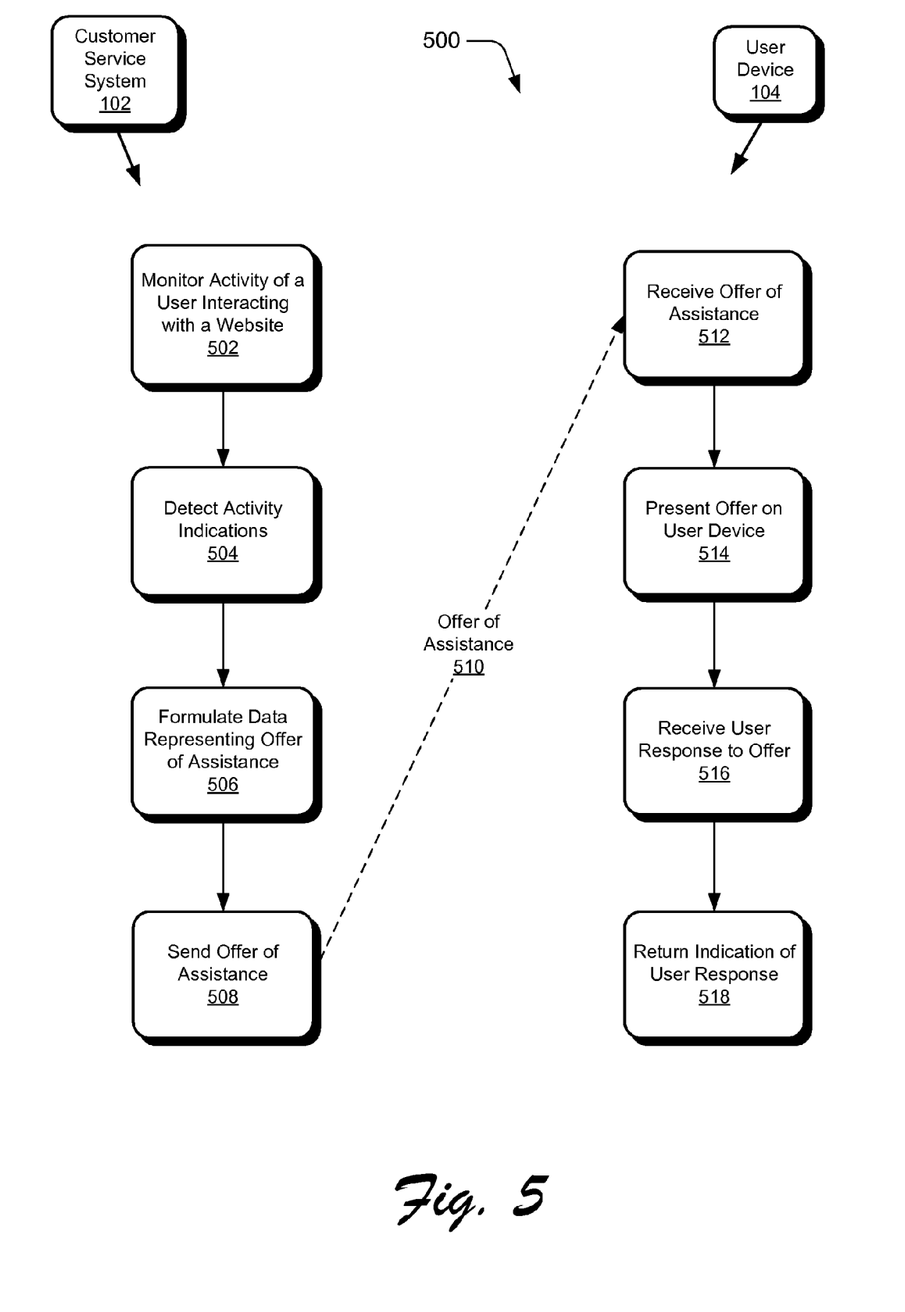
FIG. 5 is a flow diagram illustrating an exemplary method in which implementation(s) of online customer service via website navigation intervention can be accomplished.

Methods for online customer service via website navigation intervention, such as methods 400 and 500 described with reference to respective FIGS. 4 and 5, are described in the general context of computer executable instructions. Generally, computer executable instructions may include applications, routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment computer executable instructions may be located in both local and remote computer storage media, including memory storage devices.

FIG. 4 illustrates exemplary embodiments of the methods 400 for online customer service via website navigation intervention. For convenience, but not limitation, the methods 400 are described herein with reference to the user device 104. However, at least part of the exemplary method 400 may be performed by other systems and components without departing from the scope and spirit of the description herein.

The order in which the method is described is not intended to be construed as a limitation, and any number of the described method blocks can be combined in any order to implement the method, or an alternate method. The method can be implemented in any suitable hardware, software, firmware, or combination thereof.

Block 402 represents sending a request for online website assistance from a device or system associated with a user, such as the user 114. FIG. 1 provides an example of such a user device at 104. For example, the user 114 may activate an icon or hyperlink, or enter text in a form on the website to initiate a request for assistance. The customer service system 102 may receive a request for assistance when one of the above actions is initiated by the user 114 via the user device 104.

Block 404 represents surrendering control of the user device 104 to the customer service system 102, for example, to enable the customer service representative 112 to manually navigate remotely on the user device 104. Block 404 may be performed by a navigation intervention receiver (e.g., 316) included within the user device 104. For example, while navigating a hotel website, the user 114 may not understand the reservation process for booking a hotel room online. The customer service representative 112 may identify the reservation page of the website where the user 114 is experiencing difficulty and may take over navigation of the user interface in order to aid the user 114 in making a reservation.

Block 406 represents receiving data constituting assistance rendered to the user 114 in response to the request received in block 402. Continuing the previous example, the customer service module 108 may determine from the request for assistance that the user 114 does not understand how to book the hotel room desired for specific dates. In response to this determination, block 406 may include receiving data representing assistance directing the user 114 how to book the hotel room. In this example, the user 114 is assisted directly and can view on the user device 104 how to book the hotel room. In some instances, the user may complete the transaction on their own that originally led to the request for assistance. In other instances, the customer service representative can complete the transaction with the user, and the customer service system may then send a confirmation to the user regarding the transaction. This confirmation may take be sent via email or regular mail. Or, the user may never completely finish the on-line activity and just "log-off" to end the transaction.

Block 408 represents regaining control of the user device 104 following the completion of the navigation takeover assistance by the customer service representative 112. For example, as soon as the demonstration of the online reservation process for a hotel room is completed, the tools described herein may enable the customer service representative 112 to surrender control of the user device 104 back to the user 114.

FIG. 5 illustrates exemplary embodiments of the methods 500 for online customer service via website navigation intervention and is described with reference to the customer service system 102 of FIG. 2 and the exemplary method 500 of FIG. 5. The order in which the method is described is not intended to be construed as a limitation, and any number of the described method blocks can be combined in any order to implement the method, or an alternate method. The method can be implemented in any suitable hardware, software, firmware, or combination thereof.

Block 502 represents monitoring activity of a user interface of a user device, such as the user device 104, in which a user, such as the user 114, is interacting with a website. A customer service module (e.g., 108) may enable a customer service representative, such as the representative 112, to monitor activity on a website, or may automatically monitor such activity.

Block 504 represents detecting indications of various activities that suggest that the user 114 may benefit from at least one offer of assistance. These offers of assistance may include offers of expanded options provided via the website. Continuing with the previous example, the user 114 browsing the website may be switching back and forth between two product options on the website, or the user may be repeatedly visiting the website in short increments of time and viewing the same products during each visit. The customer service representative 112 associated with the website may inquire whether the user 114 may desire other options than those offered on the website. The inquiry by the customer service representative 112 may include a pop-up message, text or voice message, or audio communication via broadband internet connection. The user 114 may respond to the inquiry by return text message or audio communication.

Block 506 represents formulating data representing one or more offers of assistance to the user 114. In some implementations, block 506 may include offering expanded options to the user 114, and formulating data for conveying these expanded options or offers to the user. For example, the customer service system 102 may enable the customer service representative 112 to offer a better price for the products the user 114 is viewing on the website than the price listed on the website. More specifically, the customer service system 102 may determine the price that the customer service representative 112 is authorized to offer the user 114. The user 114 may accept or deny extended offers, or may inquire about additional offers or other options other than those already proposed by the customer service representative.

Block 508 represents sending the data constituting the offer of assistance to the user device 104. For example, if the offer of assistance takes the form of expanded options made available to the user 114, then block 508 may include sending data representing those options for display on the user device 104. More generally, block 508 may include sending data representing any suitable offer of assistance, expanded options, upsell items, or the like to the user. FIG. 5 denotes data representing the offer of assistance generally at 510.

Block 512 represents receiving the data representing one or more offers of assistance 510. In the example shown in FIG. 5, the user device 104 (or software executing thereon) may receive the offer of assistance.

Block 514 represents presenting the offer of assistance on the user device 104. As described elsewhere herein, the offer of assistance may include expanded options chose for and made available to a particular user, upsell offers chosen to entice the user 114 to transact further with the website, interventions by the customer service representative 112 to assist in navigating the website, or the like. Block 514 may include generating and rendering a graphical representation of the offer received in block 512.

Block 516 represents receiving a user response to the offer received in block 512 and presented in block 514. For example, the user 114 may interact with a graphical representation of the offer, to accept the offer or to reject it. Additionally, in some instances, the user 114 may ignore the offer and not interact with it at all.

Block 518 represents returning an indication of the user response to the offer of assistance received in block 512. While not shown in FIG. 5 in the interests of conciseness, blocks 512-518 may be repeated for multiple offers of assistance directed to a given user device. However, FIG. 5 omits the details of these iterations. Additionally, block 518 may represent returning multiple indications of multiple responses from the given user 114, if that user interacts repeatedly with a single given offer. In some instances, the user 114 may indicate that the offer of assistance at least partially addressed the activity detected in block 504. In other instances, the user 114 may indicate that the offer of assistance did not address this activity. In any event, block 518 may indicate a level of resolution achieved by the offer of assistance.

Although embodiments of online customer service via website navigation intervention have been described in language specific to features and/or methods, it is to be understood that the subject of the appended claims is not necessarily limited to the specific features or methods described. Rather, the specific features and methods are disclosed as exemplary implementations of online customer service via website navigation intervention.

The invention claimed is:

1. A non-transitory computer-readable storage medium encoded with an executable computer program for providing online customer service via website navigation intervention and, when executed by a processor, causes the processor to perform operations comprising:
   monitoring activity of a user who is interacting with a website via a user device;
   detecting from the activity indications that the user may benefit from assistance, the detecting comprising detecting browsing activity of the user including clicks on the website in rapid succession;
   formulating data representing an offer of assistance to the user;
   sending an offer of multiple different communications modalities for communicating with an agent to the user device for display on the user device;
   receiving a selected communications modality among the multiple different communications modalities from the user;
   sending the formulated data representing the offer of assistance to the user device for display on the user device by the selected communications modality;
   assisting the user in response to acceptance of the offer of assistance; and
   capturing control of the user device to demonstrate additional offers for sale in response to a selection by the user of a selectable linked indicator.

2. The non-transitory computer-readable storage medium of claim 1,
   wherein the detecting further comprises detecting repeated switching between website pages.

3. The non-transitory computer-readable storage medium of claim 1,
   wherein the capturing control of the user device is effected by collaborating components of collaboration software installed on the user device and on a remove intervening device.

4. The non-transitory computer-readable storage medium of claim 3, wherein the capturing control of the user device is effected by a navigation intervention collaboration software application.

5. The non-transitory computer-readable storage media medium of claim 3, further comprising:
   surrendering control of the user device back to the user.

6. The non-transitory computer-readable storage media medium of claim 3,
   wherein the sending the offer of multiple different communications modalities includes offering assistance via a network connection utilizing one of voice or text messaging, voice over internet protocol, and a public switched telephone network (PSTN).

7. The non-transitory computer-readable storage medium of claim 6,
   wherein the network connection is a broadband connection to the internet.

8. A user device, comprising:
   a display by which a user can interact with a website using the user device, the user device being able to be monitored during user interaction with the website;
   a navigation intervention receiver for surrendering and regaining control of the user device when website activity indications are detected indicating that the user may benefit from assistance, the detecting comprising detecting browsing activity of the user including clicks on the website in rapid succession; and
   a navigation module including a processor and software instructions for:
   sending a request for assistance with the website;
   receiving an offer of multiple different communications modalities for communicating with an agent as a display on the display of the user device;
   sending a selection of one of the multiple different communications modalities to a customer service system device;
   receiving formulated data representing an offer of assistance by the selected communications modality on the display of the user device; and
   receiving assistance from the customer service system by the selected communications modality on the display of the user device,
   wherein the navigation module is configured to accept direct assistance via manipulation of a user interface to demonstrate additional offers for sale in response to a selection by the user of a selectable linked indicator.

9. The user device of claim 8,
   wherein the navigation module is for activating a hyperlink on the website, for entering and sending information via a provided form, or for communicating through voice or text messaging via one of a network connection, voice over internet protocol, and a public switched telephone network (PSTN).

10. The user device of claim 8,
    wherein the navigation module is for:
    receiving an offer of assistance in response to the request for assistance;
    presenting a representation of the offer of assistance on the user device; and
    receiving from the user an indication of a response to the offer of assistance.

11. The user device of claim 10,
    wherein the navigation module is for receiving an offer of an expanded option.

12. The user device of claim 10,
    wherein the navigation module is for returning an indication of the user response to the offer of assistance.

13. The user device of claim 12,
    wherein the navigation module is for returning an indication of a level of resolution achieved by the offer of assistance.

14. A computer-implemented method, comprising:
    monitoring activity of a user who is interacting with a website via a user device;
    detecting indications from the activity that the user may benefit from assistance, the detecting comprising detecting browsing activity of the user including clicks on the website in rapid succession;
    formulating data representing an offer of assistance to the user;
    sending an offer of multiple different communications modalities for communicating with an agent to the user device for display on the user device;

receiving a selected communications modality among the multiple different communications modalities from the user;

sending the formulated data representing the offer of assistance to the user device for display on the user device by the selected communications modality;

assisting the user in response to acceptance of the offer of assistance and capturing control of the user device to demonstrate additional offers for sale in response to a selection by the user of a selectable linked indicator.

15. The method of claim 14, wherein a sales facilitation application of a customer service system monitors the activity of the user.

16. The method of claim 14, wherein detecting indications from the activity further includes detecting rapid switching on the website from a first option to a second option.

17. The method of claim 14, wherein formulating data includes formulating one of an offer for presentation to the user online, an offer of lower prices for existing website options, an offer of additional options not presented on the website, and an offer of lower prices than prices associated with a competitor website.

* * * * *